United States Patent
Röhr et al.

(10) Patent No.: US 11,384,670 B2
(45) Date of Patent: Jul. 12, 2022

(54) MIXER ASSEMBLY UNIT

(71) Applicant: Eberspächer Exhaust Technology GmbH & Co. KG, Neunkirchen (DE)

(72) Inventors: Benjamin Röhr, Esslingen (DE);
Roland Schwarz, Esslingen (DE);
Frank Müller, Esslingen (DE);
Joachim Müller, Metzingen (DE);
Herve Tchamgoue, Esslingen (DE);
Frank Berkemer, Eningen (DE);
Martin Strähle, Wendlingen (DE);
Peter Gorke, Stuttgart (DE)

(73) Assignee: PUREM GMBH, Neunkirchen (DE)

( * ) Notice: Subject to any disclaimer, the term of this patent is extended or adjusted under 35 U.S.C. 154(b) by 1109 days.

(21) Appl. No.: 15/725,724

(22) Filed: Oct. 5, 2017

(65) Prior Publication Data

US 2018/0100422 A1   Apr. 12, 2018

(30) Foreign Application Priority Data

Oct. 11, 2016   (DE) ..................... 10 2016 119 294.5
Oct. 24, 2016   (DE) ..................... 10 2016 120 171.5

(51) Int. Cl.
*F01N 3/28* (2006.01)
*B01F 5/06* (2006.01)
*F01N 13/18* (2010.01)
*B01F 25/421* (2022.01)
(Continued)

(52) U.S. Cl.
CPC ........ *F01N 3/2892* (2013.01); *B01F 25/4231* (2022.01); *B01F 25/4315* (2022.01); *F01N 3/2066* (2013.01); *F01N 13/185* (2013.01); *F01N 13/1872* (2013.01); *B01F 25/431972* (2022.01); *B01F 25/431974* (2022.01);
(Continued)

(58) Field of Classification Search
CPC ... B01F 5/0616; B01F 25/4315; F01N 13/185
See application file for complete search history.

(56) References Cited

U.S. PATENT DOCUMENTS

| | | | |
|---|---|---|---|
| 2013/0188444 A1* | 7/2013 | Palmer ................ | B01F 5/0606 366/337 |
| 2015/0315943 A1* | 11/2015 | Gschwind ............ | B01F 5/0616 422/180 |
| 2016/0032809 A1* | 2/2016 | Kobe ................... | B01F 5/0614 60/324 |

FOREIGN PATENT DOCUMENTS

| | | |
|---|---|---|
| CN | 104520549 A | 4/2015 |
| DE | 10 2007 012790 A1 | 9/2008 |
| DE | 10 2008 064 075 A1 | 8/2009 |

(Continued)

*Primary Examiner* — Elizabeth Insler
(74) *Attorney, Agent, or Firm* — McGlew and Tuttle, P.C.

(57) ABSTRACT

A mixer assembly unit, especially for an exhaust system of an internal combustion engine of a vehicle, includes a mixer body (48) with an incoming flow side (58) and with an outgoing flow side (60); and a carrier element (24) with a carrier element body (44) enclosing the mixer body (48) radially on an outside in relation to a mixer longitudinal axis. The mixer body (48) includes a plurality of flow deflection elements (62) and at least one holding area (70). The carrier element (24) includes a counter holding area (46) in association with a holding area (70). The counter holding area (46) is connected in substance to the holding area (70). The counter holding area (46) overlaps the holding area (70) at least partly radially on a side oriented in a direction of the outgoing flow side (60) of the mixer body (48).

20 Claims, 4 Drawing Sheets

(51) Int. Cl.
*B01F 25/431* (2022.01)
*F01N 3/20* (2006.01)
(52) U.S. Cl.
CPC ...... *F01N 13/1838* (2013.01); *F01N 2240/20* (2013.01); *Y02A 50/20* (2018.01); *Y02T 10/12* (2013.01)

(56) References Cited

FOREIGN PATENT DOCUMENTS

| | | |
|---|---|---|
| DE | 10 2013 201 402 A1 | 8/2013 |
| DE | 11 2013 004008 T5 | 5/2015 |
| DE | 10 2014 215 083 A1 | 2/2016 |
| EP | 2 474 721 A1 | 7/2012 |
| EP | 2474721 A1 * | 7/2012 ............ B01F 5/0616 |
| EP | 2979750 A1 | 2/2016 |
| WO | 84/02088 A1 | 6/1984 |
| WO | 2014/025538 A1 | 2/2014 |

* cited by examiner

MIXER ASSEMBLY UNIT

CROSS REFERENCE TO RELATED APPLICATIONS

This application claims the benefit of priority under 35 U.S.C. § 119 of German Applications 10 2016 119 294.5, filed Oct. 11, 2016, and 10 2016 120 171.5, filed Oct. 24, 2016, the entire contents of which are incorporated herein by reference.

FIELD OF THE INVENTION

The present invention pertains to a mixer assembly unit that can be used, for example, in an exhaust system of an internal combustion engine of a vehicle for mixing a reactant, which was injected into the exhaust gas emitted from an internal combustion engine, with the exhaust gas.

BACKGROUND OF THE INVENTION

To reduce the emission of harmful substances especially from diesel internal combustion engines in motor vehicles, it is known to inject a reactant, for example, a urea/water solution, into the exhaust gas emitted from the internal combustion engine in order to carry out a selective catalytic reduction in a catalytic converter device integrated into the exhaust system for reducing the nitrogen oxide content in the exhaust gas. In order thereby to achieve an efficient mixing of the exhaust gas with the reactant injected into same, a mixer, which brings about a swirling of the exhaust gas flowing in the exhaust system with a plurality of blade-like (blade-shaped or partially blade-shaped) flow deflection elements and thus a mixing with the injected reactant, is integrated into the exhaust system downstream of the reactant injection and upstream of the catalytic converter device. Such mixers are generally configured such that they are, in principle, mounted in the interior of tubular exhaust gas-carrying elements of the exhaust system and are carried thereon in their radially outer area.

SUMMARY OF THE INVENTION

An object of the present invention is to provide a mixer assembly unit guaranteeing an efficient mixing of exhaust gas and reactant and secured against detachment from the exhaust system.

According to the present invention, this object is accomplished by a mixer assembly unit, especially for an exhaust system of an internal combustion engine of a vehicle, comprising a mixer body with an incoming flow side and with an outgoing flow side; and a carrier element with a carrier element body enclosing the mixer body radially on the outside in relation to a mixer longitudinal axis, wherein the mixer body comprises a plurality of flow deflection elements and at least one holding area, wherein the carrier element comprises a counter holding area in association with at least one holding area, wherein at least one counter holding area is connected in substance to a holding area, and wherein at least one counter holding area overlaps a holding area at least partly radially on a side oriented in the direction of the outgoing flow side of the mixer body.

The mixer assembly unit configured according to the present invention is, in principle, divided into two functional areas. On the one hand, the mixer body is provided, which can be configured in an optimized manner in relation to the requirements placed on it in case of the mixing of reactant and exhaust gas. On the other hand, the carrier element is provided, which is provided, in principle, as a component configured separately from the mixer body and can thus be configured in an optimized manner in relation to the existing requirements on securing and stably carrying the mixer body at an exhaust system. These two system areas, the mixer body and the carrier element, are permanently connected to one another in substance, preferably by welding, in the area of at least one counter holding area and an associated holding area. In addition, there is a positive-locking connection in the area of at least one counter holding area and of the holding area interacting with it due to the radial overlap, which prevents the motion of the mixer body in the downwards direction and thus in the direction towards the catalytic converter device positioned downstream, in the event of a failure of the connection in substance. Also in case the connection in substance between the carrier element and the mixer body is no longer effective, a reliable holding of the mixer body at the site of installation is thus provided, so that such a mixer assembly unit that is damaged due to the failure of the connection in substance can be replaced with a new mixer assembly unit without the risk that there will be damages to other system areas of an exhaust system.

In order to be able to achieve an essentially uniform holding interaction between the carrier element and the mixer body over the entire circumference in case of the mixer assembly unit according to the present invention, it is proposed that the carrier element body have a ring-like (ring shape) configuration, or/and that a plurality of counter holding areas, which extend radially inwards and are spaced circumferentially apart from one another, be provided at the carrier element body.

To obtain a configuration that can be produced in a simple and cost-effective manner and meets the thermal requirements in an exhaust system, the carrier element may have a plate-like (plate-shape) configuration and preferably be configured as a shaped sheet metal part.

It is proposed that at least one counter holding area at least partly axially overlap an associated holding area for a more improved holding interaction between the carrier element and the mixer body.

In order to thereby secure the mixer body against excessive radial motion, provisions may be made for at least one counter holding area to axially overlap the associated holding area radially on the inside.

In case of a configuration guaranteeing a stable and secure hold and at the same time also permitting a tolerance compensation, at least one counter holding area may comprise an essentially U-shaped holding section with two U-legs and a connection area connecting these legs, wherein the U-legs and the connection area define a holding area mounting space, which is essentially open in the direction towards the incoming flow side of the mixer body. Since the holding area mounting space is open in the direction towards the incoming flow side, it is not open in the direction towards the outgoing flow side against an outlet of the holding area of the mixer body mounted therein, so that a motion of the mixer body out of the holding area mounting space in the downstream direction is not possible even in case of failure of the connection in substance.

In order to be able to guarantee a stable connection over a long operating life, especially taking into account various thermal expansions of the mixer body, on the one hand, and of the carrier element, on the other hand, it is further proposed that one of the U-legs be arranged radially on the outside in relation to a holding area which is arranged in the holding area mounting space; that one of the U-legs be arranged radially on the inside in relation to the holding area arranged in the holding area mounting space; and that the holding area be connected to the U-leg, which is arranged radially on the inside in relation to this holding area; or/and an intermediate space be provided between the holding area and the U-leg which is arranged radially on the outside in relation to this holding area.

When the mixer body is connected in substance to the carrier element in the area of at least one, and preferably of each counter holding area radially overlapping a holding area, both the connection in substance and the positive-locking connection can be established in these holding areas and counter holding areas interacting with one another, and thus an efficient utilization of the holding areas and counter holding areas provided can be guaranteed.

In order to be able to obtain a configuration which is stable and essentially does not compromise the flow guiding in the area of the mixer body, it is proposed that at least one holding area be adjacent to a radially outer area of at least one flow deflection element. Provisions may especially be made in this case for at least one holding area to comprise a holding web connecting two flow deflection elements to one another.

For a symmetrical configuration which is especially advantageous with respect to flow guiding, it is proposed that at least some of the flow deflection elements and preferably all flow deflection elements be arranged following one another in the circumferential direction, and that a ring-like connection area connecting these flow deflection elements to one another and providing at least one holding web be provided at a radially outer area of at least some of the flow deflection elements and preferably of all flow deflection elements. In this connection, when the mixer body is configured, for example, as a cast metal component, the connection area may be configured as being integral with the flow deflection elements connected by this area.

The present invention further pertains to an exhaust system, especially for an internal combustion engine of a vehicle, comprising at least one mixer assembly unit configured according to the present invention.

For integration of at least one mixer assembly unit into the exhaust system, provisions may be made for this mixer assembly unit to be arranged in an area of two tubular exhaust gas-carrying elements bordering one another, wherein each of the exhaust gas-carrying elements in the border area comprises a preferably flange-like (flange-shape) coupling section for coupling with the coupling section of the respective other exhaust gas-carrying element, and wherein the carrier element body of a mixer assembly unit is arranged between the coupling sections of the exhaust gas-carrying elements.

In an embodiment especially advantageous for a simplified configuration of an exhaust system, provisions may be made for at least one, preferably a plurality of fixing straps extending behind the coupling section of one of the exhaust gas-carrying elements to be provided at the carrier element body. By means of such fixing straps, the mixer assembly unit can be preassembled with one of the exhaust gas-carrying elements and can then be assembled in a simple manner with the other of the two exhaust gas-carrying elements due to the fixing straps held rigidly thereon.

In order to be able to provide a simple configuration especially in the area of the exhaust gas-carrying elements, on the one hand, and to be able to guarantee that exhaust gas can flow entirely about the mixer body, on the other hand, it is proposed that an outer dimension, preferably outer diameter, of the mixer body of the mixer assembly unit not be greater than an inner dimension, preferably inner diameter, of a downstream exhaust gas-carrying element of the two exhaust gas-carrying elements. In such a configuration, the securing of the mixer body against motion in the downstream direction in case of failure of the connection in substance has an especially distinct effect, since the mixer body could move unhindered towards the catalytic converter device in the interior of the downstream exhaust gas-carrying element in case of the absence of securing because of the dimensioning in the case of failure of the connection in substance.

The present invention will be described in detail below with reference to the figures attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
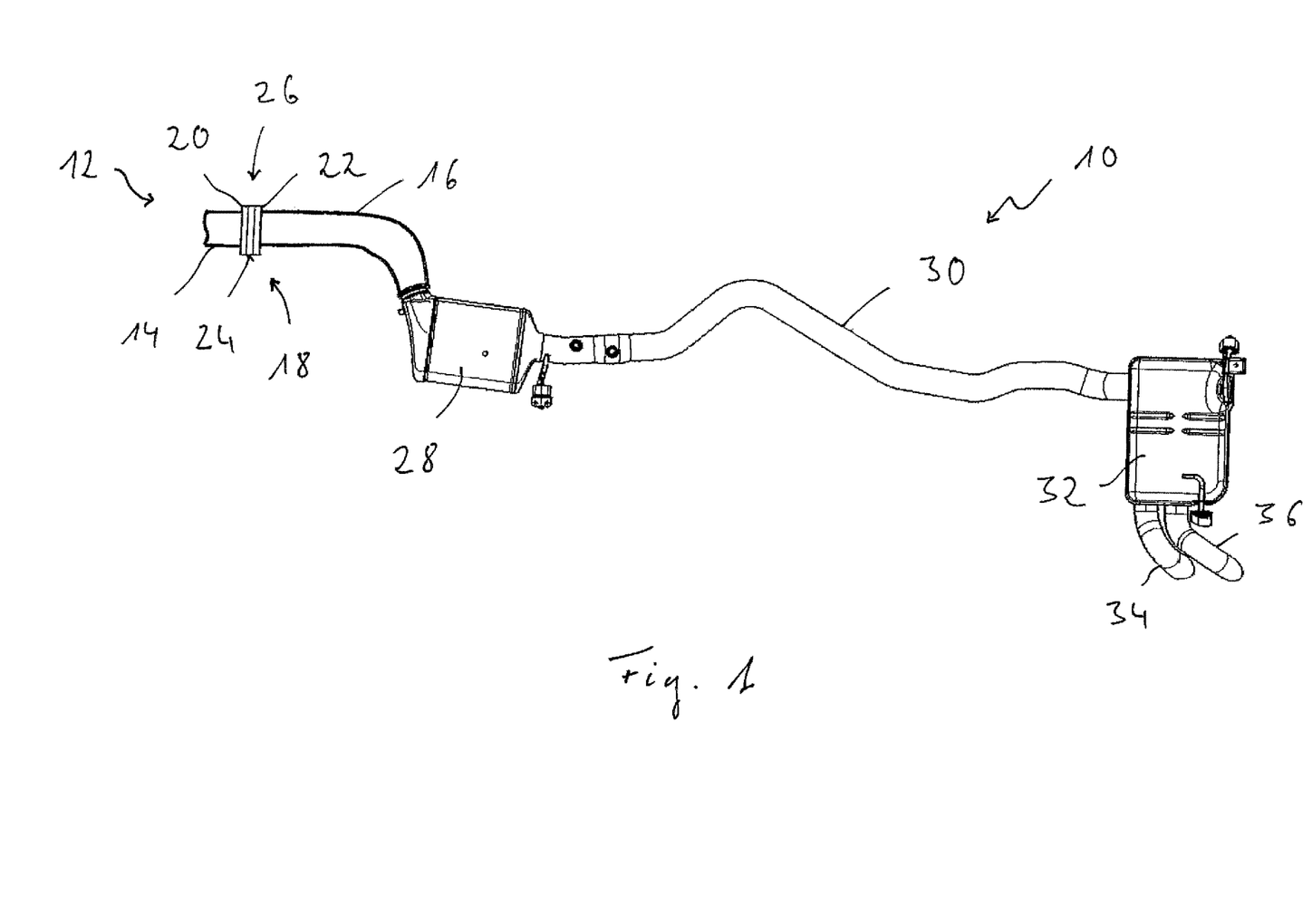
FIG. 1 is a top view showing an exhaust system of an internal combustion engine of a vehicle.

Referring to the drawings, an exhaust system for an internal combustion engine of a vehicle is generally designated by 10 in FIG. 1. The exhaust system 10 has two tubular exhaust gas-carrying elements 14, 16 adjacent to one another in an upstream area 12. These exhaust gas-carrying elements 14, 16 have each a flange-like coupling section 20 and 22, respectively, in a border area 18, in which these exhaust gas-carrying elements are permanently connected to one another, for example, by bolts passing through the flange-like coupling sections 20, 22. A carrier element 24 of a mixer assembly unit generally designated by 26, which carrier element 24 will be described in even more detail below, is positioned between the two flange-like coupling areas 20, 22 and is thus fixed to the exhaust system 10 by means of the bolts, which are, e.g., also passing through this carrier element 24, with the two exhaust gas-carrying elements 14, 16 and their flange-like coupling sections 20, 22 in the border area 18.

The border area 18 is located downstream of a reactant injection device, by means of which a reactant, for example, a urea/water solution, can be injected into the exhaust gas stream. A catalytic converter device, which is generally designated by 28, in which the mixture of exhaust gas and reactant is subjected to a selective catalytic reduction in order to thus lower the nitrogen oxide content in the exhaust gas, is provided downstream of the border area 18, bordering on the exhaust gas-carrying element 16. Via another exhaust gas-carrying element 30, the exhaust gas reaches an exhaust gas muffler 32, from which this exhaust gas is discharged to the outside, for example, via two tail pipes 34, 36.

It should be pointed out that the exhaust system shown in FIG. 1 represents only one example of a plurality of different configurations of such an exhaust system. Thus, a plurality of mufflers could be integrated into the exhaust system 10. A plurality of catalytic converter devices could also be provided in order to further lower the harmful substance content in the exhaust gas in this manner.

The mixer assembly unit 26, which is positioned in the border area 18 of the two exhaust gas-carrying elements 14, 16 downstream of the reactant injection device and upstream of the catalytic converter device 28 for carrying out a selective catalytic reduction, is described in detail below with reference to FIGS. 2 through 5.

Figure 2:
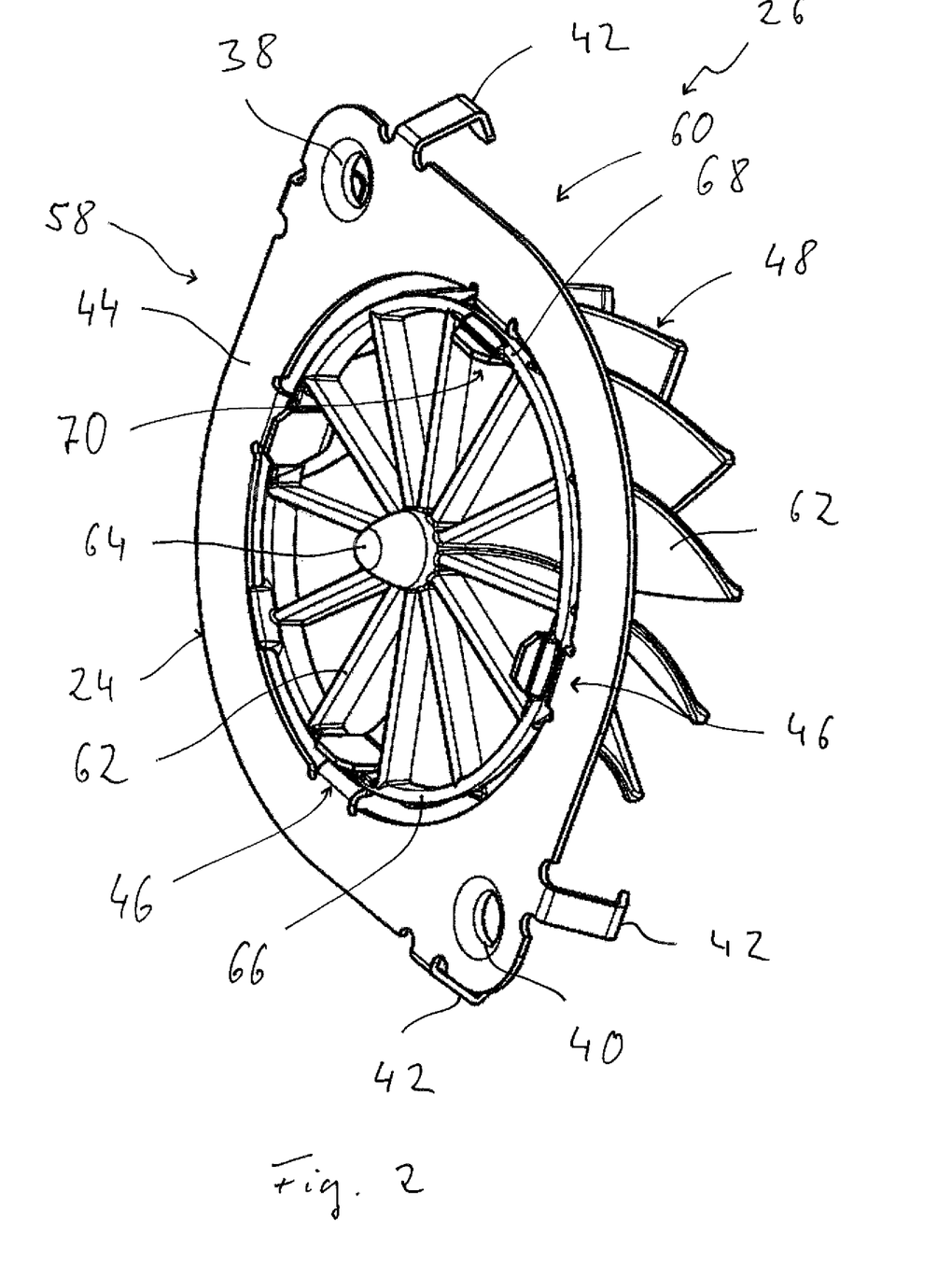
FIG. 2 is a perspective view of a mixer assembly unit.
Figure 3:
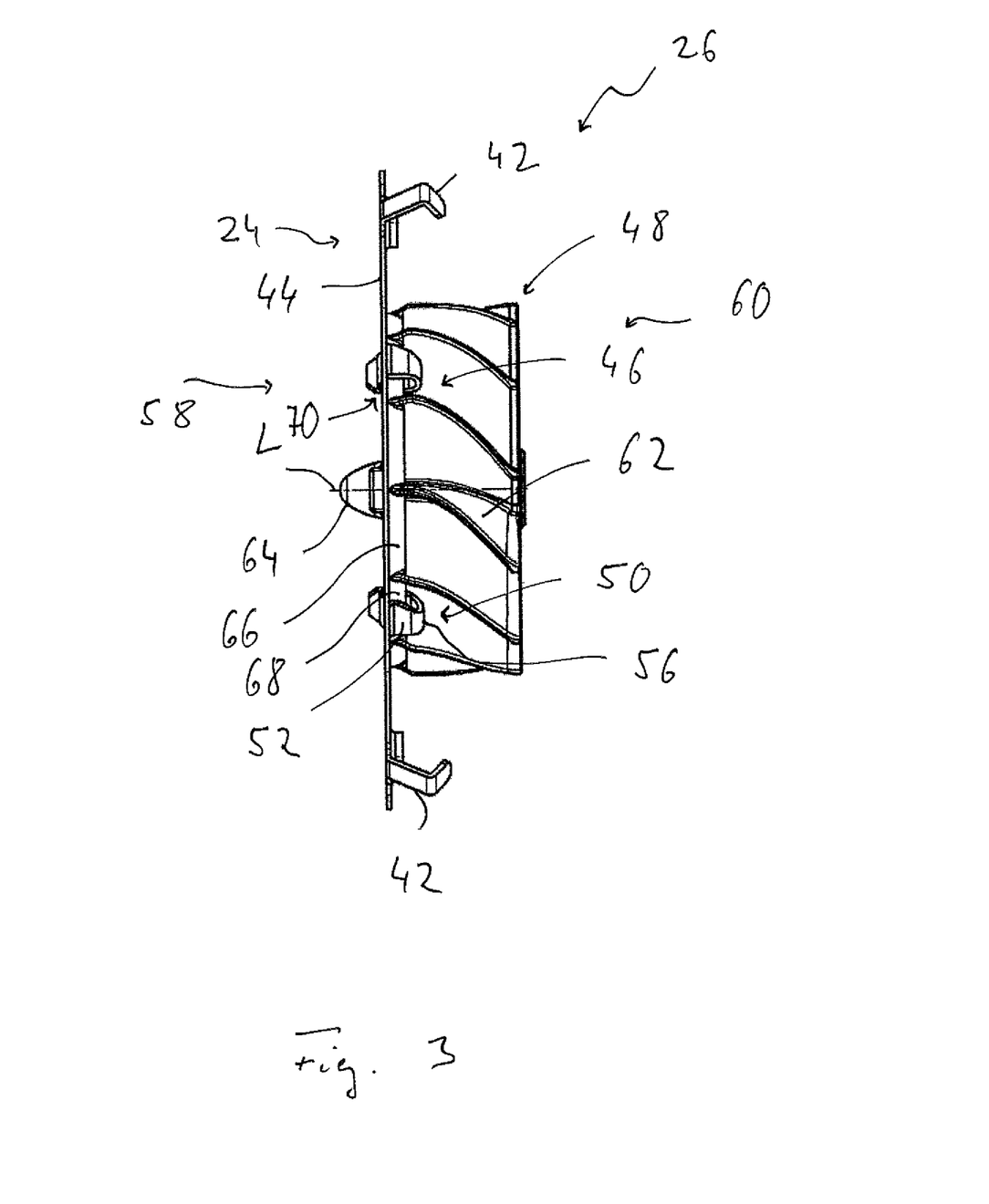
FIG. 3 is a lateral view of the mixer assembly unit of FIG. 2.

FIG. 2 shows the mixer assembly unit 26 in a perspective view. The mixer assembly unit 26 comprises the already mentioned carrier element 24, which preferably has a plate-like configuration and whose circumferential contour may correspond, for example, essentially to the circumferential contour of the flange-like coupling section 22. Just as the flange-like coupling section 22, the carrier element 24, which is preferably provided as a shaped sheet metal part and has a plate-like configuration, is configured with a ring-like structure and has radial expansions on two circumferential areas located opposite one another with openings 38, 40, through which the bolts connecting the two flange-like coupling sections 20, 22 and thus the exhaust gas-carrying elements 14, 16 can be passed.

To be able to combine the carrier element 24 and the mixer assembly unit 26 as a preassembled assembly unit with the exhaust gas-carrying element 16, the carrier element 24 has, for example, in the two above-mentioned circumferential areas, fixing straps 42, which are bent or are bent at the exhaust gas-carrying element 16 after positioning the mixer unit 26, such that they extend behind the flange-like coupling section 22 and thus fix the mixer assembly unit 26 to this section 22. The thus assembled assembly unit can then be assembled with the exhaust gas-carrying element 14 in a simple manner by the flange-like coupling section thereof being fixed to the flange-like coupling section 22 or the carrier element 24 and being connected therewith by screw connection.

Four counter holding areas 46, to which a mixer body, generally designated by 48, of the mixer assembly unit 26 is secured, are provided at preferably uniform circumferential distances to one another in the exemplary embodiment shown at an inner circumferential area of a carrier element body, generally designated by 44, of the carrier element 24, from which carrier element body 44 the fixing straps 42 also extend. Each of the counter holding areas 46 comprises a strap-like holding section 50 projecting inwards, which can be clearly seen in FIG. 5. Each strap-like holding section 50 has an essentially U-shaped configuration and has an outer U-leg 52, an inner U-leg 54 as well as a connection area 56 connecting these legs. The U-shaped holding sections 52 are shaped such that the holding sections 50 are open in the direction towards an incoming flow side 58 of the mixer body 48, which can be seen in FIG. 3, i.e., in the upstream direction, and are closed, especially by the connection area 56, towards an outgoing flow side 60 of the mixer body 48, which is obscured in FIG. 2, i.e., in the downstream direction. Each of the holding sections 50 has an essentially hook-like shape and thus makes possible a stable hold of the mixer body 48 at the carrier element 24. In this connection, the U-leg 52 extends, starting from the carrier element body 44, essentially in the direction of a mixer longitudinal axis L and in the direction towards the outgoing flow side 60 of the mixer body 48, while the U-leg 54 extends, starting from the connection area 56, essentially parallel to the U-leg 52 in the direction towards the incoming flow side 58 of the mixer body 48.

The mixer body 48 comprises a plurality of blade-like flow deflection elements 62 following one another in the circumferential direction and extending, for example, essentially radially in relation to the mixer longitudinal axis L. These flow deflection elements 62 start from a central body area 64 of the mixer body 48 and extend radially to the outside up to a ring-like connection area 66, which is preferably connected to the flow deflection elements 62 on the incoming flow side 58. The mixer body 48 may be provided as an integral component, for example, as a cast metal component with the central body area 64, the blade-like flow deflection elements 62 and the ring-like connection area 66.

Figures 4, 5:
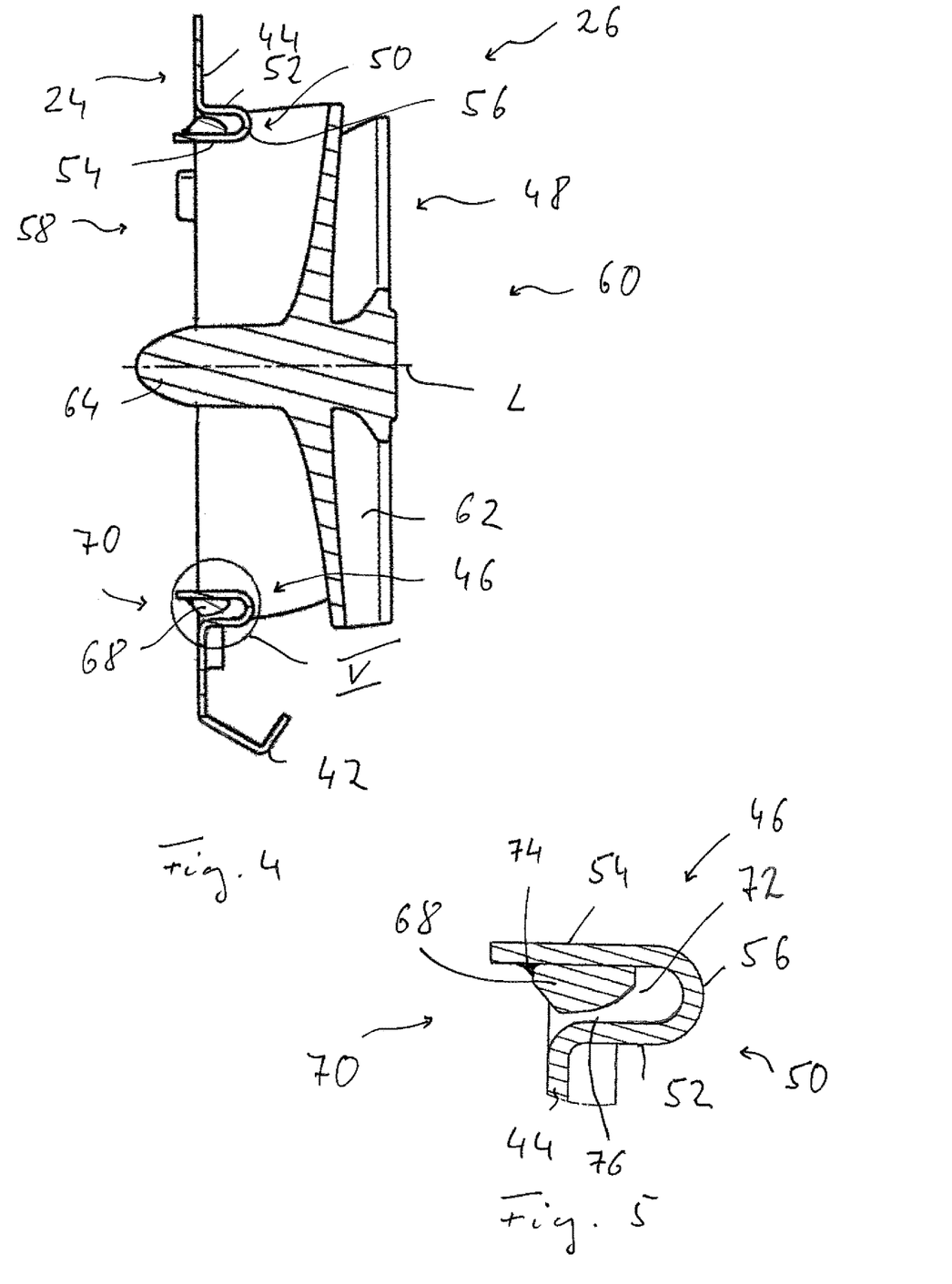
FIG. 4 is a longitudinal sectional view of the mixer assembly unit of FIG. 2.
FIG. 5 is an enlarged view of the detail V in FIG. 4.

In its areas extending between the flow deflection elements 62 directly following one another in the circumferential directions and connecting these elements to one another, the ring-like connection area 66 provides holding areas 70, each of which is configured in the form of a holding web 68, for each interacting with a counter holding area 46 of the carrier element 24. These holding areas 70, which are configured as holding webs 68, may, as shown in FIG. 5, be inserted into a holding area mounting space 72 provided by the U-shaped holding sections 50 of the counter holding areas 46, so that the holding sections 50, on the one hand, overlap the holding areas 70 interacting with same in relation to the mixer longitudinal axis L from radially outwards to radially inwards and overlap the holding areas 70 axially with the inner U-legs 54 also in the direction of the mixer longitudinal axis L. The holding webs 68, which are thus located in at least some areas within the holding area mounting spaces 72, cannot thus move out of the holding sections 50 in the direction towards the outgoing flow side 60 of the mixer body 48, i.e., they are secured against excessive axial motion, and are also essentially centered radially due to interaction with the inner U-legs 54. Thus, a defined positioning of the mixer body 48 in relation to the carrier element 24 is provided, wherein a compensation of manufacturing tolerances is made possible because of the configuration of the holding sections 50 as straps, which can be brought into their desired shape by shaping sheet metal material and which also have a certain flexibility.

The mixer body 48 is permanently connected in substance, especially by welding 74, to the carrier element 24 in the area of the holding webs 68 and of the holding sections 50. This welding preferably establishes a connection between the holding webs 68 and the inner U-legs 54, wherein the mixer body 48 is more preferably connected in substance by welding with the carrier element 24 for a uniform stable fixing over the circumference in each of the four counter holding areas 46. Counter holding areas 46 could nevertheless be provided, which are used only for securing against excessive axial motion, but not for establishing a connection in substance. Further, counter holding areas and holding areas may be provided, which are used only for establishing the connection in substance and in which the counter holding areas do not necessarily have to overlap the holding areas radially.

It is further seen in FIG. 5 that an intermediate space 76 is formed between the outer U-leg 52 and the holding web 68. The mixer assembly unit 26 is heated in the exhaust gas stream, wherein the mixer body 48, which is manufactured, for example, from cast metal material, is more intensely thermally expanded than the carrier element 24, which is generally provided as a shaped sheet metal part. By providing the intermediate space 76, sufficient space is created for the thermal expansion of the mixer body 48, especially of the ring-like connection area 66 of same, in which intermediate space 76 this connection area 66 can expand radially without coming into contact with the outer U-leg 52. In case of this radial expansion, the ring-like connection area 66 can pull the inner U-leg 54 or the inner U-legs 54 connected therewith by the weldings 74 radially outwards, which is possible because of the circumstance that the carrier element 24 is configured with comparatively greater flexibility in the area of its U-shaped counter holding areas 46 and because of the circumstance that the inner U-legs 54 have a greater axial extension than the outer U-legs 52, without generating tensions excessively stressing the weldings 74.

During operation, the mixer assembly unit 26 is exposed to a comparatively high mechanical stress, especially due to vibrations occurring in a vehicle and the high temperatures in the exhaust system 10. Under unfavorable circumstances, this may lead to damage to the connection in substance, so that in the extreme case the mixer body 48 could detach from the carrier element 24. Since the mixer body 48 is held against a detachment from the carrier element 24 in the downstream direction, i.e., in the direction towards the flow-carrying element 16 and the catalytic converter unit 28 due to the interaction of the holding areas 70 with the counter holding areas 46, there is no risk that in such a state the mixer body 48, whose outer dimension, for example, outer diameter, will generally at least not be greater than the inner dimension, i.e., for example, the inner diameter, of the exhaust gas-carrying element 16, can move into this exhaust gas-carrying element 16 and towards the catalytic converter device 28. After the detachment of the mixer body 48 from the carrier element 24 occurring in case of a failure of the connection in substance, rattling noises may occur, but damage to the downstream system areas is avoided. Thus, after uncoupling the two exhaust gas-carrying elements 14, 16 from one another, the mixer assembly unit 26 can be removed and be replaced with a new one.

It should be pointed out that a great variety of variations may also be made in the area of the mixer assembly unit 26 within the scope of the present invention. Thus, for example, more or fewer than the four counter holding areas 46 shown could also be provided. For example, the mixer body 48 could also be configured such that holding areas, i.e., for example, a holding web 68 connecting two adjacent flow deflection elements 62, are provided only where a holding interaction is to be provided with counter holding areas 46. The mixer body 48 itself could also be provided with another configuration. Another ring-like connection area could, for example, be provided on the outgoing flow side in order to increase the stability of the mixer body 48. The geometry of the blade-like deflection elements 62 could be selected differently than shown in FIG. 2.

Further, the holding areas could be configured with recesses essentially open in the radial direction, into which counter holding areas, which are meshing with holding areas from radially outwards, can be positioned, so that a radial overlap likewise forms and the mixer body is held against moving in the and optionally against the gas flow direction. In this case as well, a respective holding area is overlapped radially at an area oriented in the direction of the outgoing flow side or downstream in the sense of the present invention.

While specific embodiments of the invention have been shown and described in detail to illustrate the application of the principles of the invention, it will be understood that the invention may be embodied otherwise without departing from such principles.

What is claimed is:

1. A mixer assembly unit, for an exhaust system of an internal combustion engine of a vehicle, the mixer assembly unit comprising:
   a mixer body with an incoming flow side and with an outgoing flow side, the mixer body comprising a plurality of flow deflection elements and at least one holding area; and
   a carrier element with a carrier element body at least partially enclosing the mixer body radially on an outside in relation to a mixer longitudinal axis, the carrier element comprising at least one counter holding area in association with said at least one holding area, wherein said at least one counter holding area is connected in substance to the associated holding area, and wherein said at least one counter holding area overlaps the associated holding area at least partly radially on a side oriented in a direction of the outgoing flow side of the mixer body, wherein the at least one counter holding area at least partly axially overlaps the associated holding area radially on an inside of the associated holding area.

2. A mixer assembly unit in accordance with claim 1, wherein:
   the carrier element body has a ring-shape configuration; or
   a plurality of counter holding areas are provided, each of which extend radially inwards and are spaced circumferentially apart from one another, are provided at the carrier element body; or
   the carrier element has a plate-shape configuration, configured as a shaped sheet metal part; or
   any combination of the carrier element body has a ring-shape configuration and a plurality of counter holding areas are provided, each of which extend radially inwards and are spaced circumferentially apart from one another, are provided at the carrier element body and the carrier element has a plate-shape configuration, configured as a shaped sheet metal part.

3. A mixer assembly unit in accordance with claim 1, wherein:
   the at least one counter holding area comprises an essentially U-shaped holding section with two U-legs and a connection area connecting these U-legs; and
   the U-legs and the connection area define a holding area mounting space, which is essentially open in a direction towards the incoming flow side of the mixer body.

4. A mixer assembly unit in accordance with claim 3, wherein:
   one of the U-legs of the at least one counter holding area is arranged radially on an outside in relation to the associated holding area which is arranged in the holding area mounting space;
   one of the U-legs of the at least one counter holding area is arranged radially on an inside in relation to the associated holding area arranged in the holding area mounting space; and
   the associated holding area is connected to the U-leg, which is arranged radially on the inside in relation to the associated holding area or an intermediate space is provided between the associated holding area and the U-leg which is arranged radially on the outside in relation to the associated holding area or the associated holding area is connected to the U-leg, which is arranged radially on the inside in relation to the associated holding area and an intermediate space is provided between the associated holding area and the U-leg which is arranged radially on the outside in relation to the associated holding area.

5. A mixer assembly unit in accordance with claim 1, wherein the mixer body is connected in substance to the carrier element in an area of the at least one counter holding area, radially overlapping the associated holding area.

6. A mixer assembly unit in accordance with claim 1, wherein:
the at least one holding area is adjacent to a radially outer area of at least one of the flow deflection elements; and
the at least one holding area comprises a holding web connecting two of the flow deflection elements to one another.

7. A mixer assembly unit in accordance with claim 6, wherein:
at least some of the flow deflection elements are arranged following one another in a circumferential direction; and
a ring-shaped connection area, connecting said at least some of the flow deflection elements to one another provides the at least one holding web, at a radially outer area of said at least some of the flow deflection elements;
the connection area is configured integral with the flow deflection elements connected by the connection area.

8. An exhaust system, for an internal combustion engine of a vehicle, the exhaust system comprising at least one mixer assembly unit, the at least one mixer assembly unit comprising:
a mixer body with an incoming flow side and with an outgoing flow side, the mixer body comprising a plurality of flow deflection elements and at least one holding area; and
a carrier element with a carrier element body at least partially enclosing the mixer body radially on an outside in relation to a mixer longitudinal axis, the carrier element comprising at least one counter holding area in association with said at least one holding area, wherein said at least one counter holding area is connected in substance to the associated holding area, and wherein said at least one counter holding area overlaps the associated holding area at least partly radially on a side oriented in a direction of the outgoing flow side of the mixer body, wherein the at least one counter holding area at least partly axially overlaps the associated holding area radially on an inside of the associated holding area.

9. An exhaust system in accordance with claim 8, further comprising two tubular exhaust gas-carrying elements bordering one another, wherein:
each of the exhaust gas-carrying elements in a border area comprises a flange-shape coupling section;
the at least one mixer assembly unit is arranged in an area of the coupling section of the respective other exhaust gas-carrying element; and
the carrier element body of the at least one mixer assembly unit is arranged between the coupling sections of the exhaust gas-carrying elements.

10. An exhaust system in accordance with claim 9, further comprising at least one fixing strap provided at the carrier element body, the at least one fixing strap extending behind the coupling section of one of the exhaust gas-carrying elements.

11. An exhaust system in accordance with claim 9, wherein an outer dimension of the mixer body of the at last one mixer assembly unit is not greater than an inner dimension of a downstream exhaust gas-carrying element of the two exhaust gas-carrying elements.

12. An exhaust system in accordance with claim 8, wherein:
the carrier element body has a ring-shape configuration; or
a plurality of counter holding areas are provided, each of which extend radially inwards and are spaced circumferentially apart from one another, are provided at the carrier element body; or
the carrier element has a plate-shape configuration, configured as a shaped sheet metal part; or
any combination of the carrier element body has a ring-shape configuration and a plurality of counter holding areas are provided, each of which extend radially inwards and are spaced circumferentially apart from one another, are provided at the carrier element body and the carrier element has a plate-shape configuration, configured as a shaped sheet metal part.

13. An exhaust system in accordance with claim 8, wherein:
the at least one counter holding area comprises an essentially U-shaped holding section with two U-legs and a connection area connecting these U-legs;
the U-legs and the connection area define a holding area mounting space, which is essentially open in a direction towards the incoming flow side of the mixer body;
one of the U-legs is arranged radially on an outside in relation to the associated holding area arranged in the holding area mounting space;
one of the U-legs is arranged radially on an inside in relation to the associated holding area arranged in the holding area mounting space; and
the associated holding area is connected to the U-leg, which is arranged radially on the inside in relation to the associated holding area or an intermediate space is provided between the associated holding area and the U-leg which is arranged radially on the outside in relation to the associated holding area or the holding area is connected to the U-leg, which is arranged radially on the inside in relation to the associated holding area and an intermediate space is provided between the associated holding area and the U-leg which is arranged radially on the outside in relation to the associated holding area.

14. An exhaust system in accordance with claim 8, wherein the mixer body is connected in substance to the carrier element in an area of the at least one counter holding area, radially overlapping the at associated holding area.

15. An exhaust system in accordance with claim 8, wherein:
the at least one holding area is adjacent to a radially outer area of at least one of the flow deflection elements; and
the at least one holding area comprises a holding web connecting two of the flow deflection elements to one another.

16. An exhaust system in accordance with claim 8, wherein:
at least some of the flow deflection elements are arranged following one another in a circumferential direction;
a ring-shape connection area, connecting said at least some of the flow deflection elements to one another provides the at least one holding web, at a radially outer area of said at least some of the flow deflection elements; and the connection area is configured integral with the flow deflection elements connected by the connection area.

17. A mixer assembly unit, for an exhaust system of an internal combustion engine of a vehicle, the mixer assembly unit comprising:

a mixer body comprising a mixer longitudinal axis, an incoming flow side, an outgoing flow side, a plurality of flow deflection elements and at least one holding area, the at least one holding area comprising a holding area radial outer side and a holding area radial inner side, the holding area radial inner side facing in a radial inward direction of the mixer longitudinal axis, the holding area radial outer side facing in a radial outward direction away from the mixer longitudinal axis; and a carrier element comprising a carrier element body at least partially enclosing the mixer body radially on an outside in relation to the mixer longitudinal axis, the carrier element further comprising at least one counter holding area associated with said at least one holding area, wherein said at least one counter holding area is connected in substance to said at least one holding area, wherein said at least one counter holding area overlaps said at least one holding area at least partly radially on a side oriented in a direction of the outgoing flow side of the mixer body with respect to the mixer longitudinal axis, wherein the at least one counter holding area at least partly axially overlaps the holding area radial inner side.

18. A mixer assembly unit in accordance with claim 17, wherein:

the at least one counter holding area comprises an essentially U-shaped holding section, the U-shaped holding section comprising a first leg and a second leg and a connection area connecting the first leg and the second leg;

the first leg, the second leg and the connection area define a holding area mounting space, which is essentially open in a direction towards the incoming flow side of the mixer body; and one of the first leg and the second leg is located between the mixer longitudinal axis and the holding area radial inner side.

19. A mixer assembly unit in accordance with claim 18, wherein the holding area is in contact with the one of the first leg and the second leg and another one of the first leg and the second leg is located at a spaced location from the holding area.

20. A mixer assembly unit in accordance with claim 18, wherein the one of the first leg and the second leg has a first axial length and another one of the first leg and the second leg has a second axial length, the first axial length being greater than the second axial length.

* * * * *